March 6, 1962
W. J. KLUG, JR
3,024,152
STABILIZED POLYMERIC STRAND REINFORCED
PRESSURE SENSITIVE ADHESIVE TAPES
Filed Nov. 4, 1957
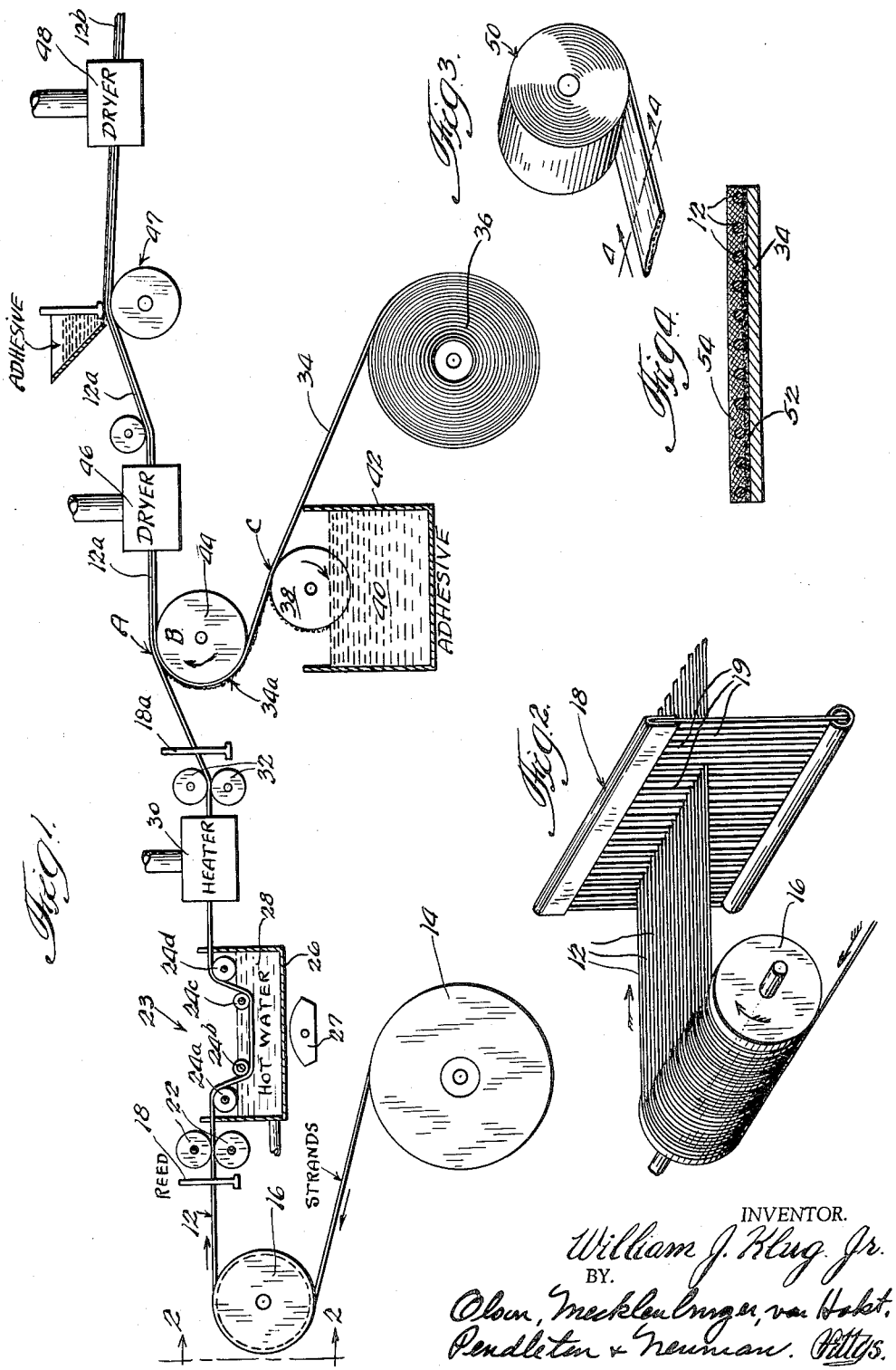
INVENTOR.
William J. Klug, Jr.
BY
Olsen, Mecklenburger, van Holst,
Pendleton & Neuman. Attys.

United States Patent Office 3,024,152
Patented Mar. 6, 1962

3,024,152
STABILIZED POLYMERIC STRAND REINFORCED PRESSURE SENSITIVE ADHESIVE TAPES
William J. Klug, Jr., Cranbury, N.J., assignor, by mesne assignments, to Johnson & Johnson, New Brunswick, N.J., a corporation of New Jersey
Filed Nov. 4, 1957, Ser. No. 694,426
5 Claims. (Cl. 156—178)

This invention relates to the production of high strength strand reinforced materials and more specifically to stabilized strand reinforced pressure sensitive adhesive tapes, stabilized strand reinforced sheeting materials particularly adapted for use as backings for pressure sensitive adhesive tapes and to methods for the manufacture thereof.

The prior art has disclosed strand reinforced pressure sensitive adhesive tapes. See, for example, Bemmels United States Patent No. 2,750,314. One of the characteristics of strand reinforced pressure sensitive adhesive tapes is that in a relatively thin tape one may achieve high tensile strengths without undue bulk or stiffness. As is disclosed in the above mentioned Bemmels patent, exceedingly high tensile strengths are achieved by preparing a pressure sensitive adhesive tape having longitudinally disposed reinforcing strands of a high tenacity material. Strands having unusual tensile characteristics are glass and nylon yarns.

While glass strands of course are well known for their high tensile strengths, it is also true that they are somewhat brittle, and sharp flexing and bending of the tapes wherein the glass strands are incorporated causes weakening of the reinforced pressure sensitive adhesive tape at this point.

Oriented nylon strands are also well known for their tensile strengths and it is possible by utilizing oriented nylon strands to prepare a pressure sensitive strand reinforced adhesive tape having high tensile properties, but which does not have the characteristic disability of glass strand reinforced pressure sensitive adhesive tapes which is encountered in the aforementioned flexing or sharp bending during use. It is to be noted, however, that in the production of strand reinforced pressure sensitive adhesive tapes utilizing oriented nylon yarn as a reinforcement, certain difficulties are encountered.

It should be understood that the term "oriented" has reference to the conventional treatment of linear polymeric materials, particularly strand-like materials, after extrusion in the hot melt form. The orientation treatment involves subjecting extruded materials to stress or cold-drawing under controlled temperature conditions to result in a material which has enhanced tensile strength in the direction or orientation. The process also results in molecular alignment in the direction of orientation which in strands is the direction parallel to the strand axis. In nylon strands the cold drawing process usually results in elongations of from 4 to 7 times the original length of the yarns and a corresponding decrease in denier. The nonelastic stretch is removed by the cold-draw process and results in a tough, elastic and high tenacity strand material. While nylon is well known for this property, other synthetic linear, thermoplastic, polymeric materials behave in a similar fashion as will be discussed more fully hereinafter.

Broadly, the process disclosed by Bemmels, supra, in preparing strand reinforced pressure sensitive adhesive tapes, involves bonding a plurality of laterally spaced and longitudinally disposed strands to a backing material with a bonding coat of a flexible cohesive, yieldable material and overlying said bonded strands with a layer of normally tacky and pressure sensitive adhesive. In some instances it has been found possible to combine the bonding coat and adhesive or the bonding coat and backing into a single layer. It has been found that tapes produced in the above manner and utilizing conventional oriented nylon strands for the reinforcement are inherently unstable and that rolls of the tapes so prepared buckle during storage to result in an unsightly and unsalable product. The buckling is principally the result of the oriented bonded strands shrinking and the backing material separating from the strands at intervals causing gaps therebetween. While the shrinkage of the strands occurs in the tape products over an extended period there is no method of storage which will alleviate the problem. This "residual shrinkage" remaining in such conventionally oriented nylon strands has been found to be about 9 to 10 percent.

The term "residual shrinkage" has reference to that change or shrinkage which occurs in conventionally oriented nylon or other synthetic polymeric strands after exposure of the untensioned strands to high temperature conditions over a prolonged period resulting in a reduction in the longitudinal dimension thereof.

For the purposes of this description, nylon and other synthetic polymeric materials which are processed so that the above described residual shrinkage is reduced to a relatively low value such as about 3.5% will hereinafter be referred to as "stabilized oriented strands." The value of 3.5% residual shrinkage has been found to be that amount which can be tolerated to produce a satisfactory tape roll which is free from the aforementioned buckling.

Accordingly, it is one of the objects of the present invention to provide a stabilized high strength strand reinforced pressure sensitive adhesive tape.

Another object of the present invention is the provision of a high strength stabilized nylon strand reinforced pressure sensitive adhesive tape.

A further object is the provision of a stabilized nylon strand reinforced pressure sensitive adhesive tape in roll form which is substantially free from buckling.

A still further object is the provision of a stablized nylon strand reinforced pressure sensitive adhesive tape in roll form which has an extended storage life.

A still further object is the provision of a method for preparing stabilized nylon strand reinforced pressure sensitive adhesive tapes.

A still further object is the provision of an oriented and stabilized polymeric strand reinforced sheeting material adapted for use as a backing in pressure sensitive adhesive tapes.

These and other objects of the present invention will be seen from the following specification, attached drawings, and appended claims.

One most preferred form of the present invention comprises a stabilized nylon strand reinforced pressure sensitive adhesive tape including a plurality of laterally spaced and longitudinally extended strands having a residual shrinkage of less than 3.5%. A cohesive rubbery yieldable matrix is provided, bonding the plurality of strands together and normally tacky and pressure sensitive adhesive overlies one surface of the layer of bonded strands. The stable tape in roll form is also included herein as a part of this invention.

Another embodiment of this invention comprises the provision of a stabilized strand reinforced sheeting material having a backing in thin sheet form, a pluralty of laterally spaced and longitudinally extending oriented and stabilized high tenacity polymeric strands having a residual shrinkage of less than 3.5%, and a cohesive, rubbery, yieldable matrix bonding said strands together and to said backing sheet. The strand reinforced sheeting is particularly adapted for use as a backing for pressure sensitive adhesive tapes of the aforementioned description, although other uses are contemplated.

The present invention also includes as a part thereof the provision of a process for preparing a stabilized nylon strand reinforced pressure sensitve adhesve tape which comprises passing conventional oriented nylon strands through a stabilizing zone whereby residual shrinkage in said strands is reduced to less than 3.5%, forming said strands into a layer of laterally spaced and longitudinally extending strands, bonding said stabilized nylon strands to a backing sheet with a soft, rubbery, cohesive and yieldable bonding coat, and applying to the backing and bonded strands a layer of overlying normally tacky and pressure sensitive adhesive.

For a more complete understanding of this invention reference will be made to the drawings wherein:

FIGURE 1 is a schematic drawing of an apparatus and process for preparing the stabilized nylon strand reinforced pressure sensitive adhesive tapes of this invention;

FIG. 2 is a drawing of a partial perspective view of strands being drawn over an idler roll and through a reed as shown in the apparatus of FIG. 1;

FIG. 3 is a perspective view of a roll of stabilized nylon strand reinforced pressure sensitive adhesive tape of the present invention; and FIG. 4 is a cross section of the strand reinforced tape taken along the line 4—4 of FIG. 3.

Referring more particularly to the drawing, in FIG. 1 is illustrated a flow sheet and apparatus for the manufacture of stabilized nylon strand reinforced pressure sensitive adhesive tape. A plurality of strands 12 are withdrawn from a beam or stock roll 14, passing over an idler roll 16 and through a reed 18. A pair of driven nip rolls 22 are maintained in contact with the strands 12 regulating the feed of the strands 12 into the apparatus. The strands 12 pass from the nip rolls 22 into a shrinking zone 23. In this particular modification, the shrinking zone 23 comprises a tank 26 containing hot water 28. A plurality of guide rolls 24a, 24b, 24c and 24d guide and maintain the strands 12 below the surface of the water 28.

A source of heat 27, such as a gas flame, may be provided to maintain the temperature of the shrinking bath. The strands pass over roll 24a and under spaced rolls 24b and 24c which are below the surface of the hot water bath, and from roll 24c to roll 24d and out of the bath zone. The strands 12 are then passed through a drying oven 30 where residual moisture is removed from the strands 12. Passing the wet strands over a heated drum will also function adequately as a drying step in the alternative. From the drying step the strands pass through another set of nip rolls 32. The rolls 32 are driven independently of the rolls 22. To allow for the shrinkage of the oriented nylon yarn in the shrinking zone 23, nip rolls 22 are driven about 7% faster than rolls 32.

The nylon strands passing through the shrinking or stabilizing zone shrink about 7% from their original length. The residual shrinkage remaining in these strands after their stabilizing treatment does not and should not exceed about 3.5% and preferably should not exceed 2.5%. The shrinking bath is maintained at about 180–212° F., and the strands reside therein for about 5–15 seconds. From the nip rolls 32 the strands 12 pass through another reed 18a to assure that their lateral spacing is maintained. The reeds 18 and 18a are identical and are formed of a plurality of teeth 19 arranged in comb-like fashion (see FIG. 2). Each individual strand passes between the teeth or blades of the reed to fix the degree of lateral spacing. If close spacing is desired, each opening in the reed might contain a strand. If one desires wider spacing, every other opening should be used for a strand guide, etc.

From the reed 18a the strands pass in their predetermined spaced relationship and are affixed and bonded to the backing material 34 at point A. The backing 34, which for example may be acetate film, is supplied from a stock roll 36. The backing 34 is removed from the stock roll 36 and passes over a coater roll 38 maintained in partial contact with a solvent solution of bonding coat 40 in tank 42. The bonding coat 40 is in contact with the lower surface of roll 38 and a film of the bonding material adheres to the surface thereof. The backing material 34 contacting the upper surface of the roll 38 at "C" "picks up" the solvent solution of the bonding material and passes to roll 44 with the coated surface 34a facing outwardly from the surface of roll 44. The spaced strands 12 from reed 18a contact the wet coated surface 34a on the backing 34 at "A" and are imbedded therein. The composite 12a composed of the strands 12 bonded to backing 34 by bonding material 40 passes through a drying oven 46 where the solvent in the bonding medium is driven off. The composite 12a then passes under a knife and roll coater 47 where a layer of normally tacky and pressure sensitive adhesive in solvent solution is applied to the strands 12 on backing 34. Solvent is removed in dryer 48 to produce the finished tape 12b which may be slit to various widths and formed into rolls for commercial use.

FIG. 3 illustrates a perspective view of a roll of stabilized nylon strand-reinforced pressure sensitive tape 50 produced in accord with the present invention.

FIG. 4 is a cross section of the tape of FIG. 3 along the line 4—4 shown as comprising a backing 34, a layer of soft, cohesive, yieldable and stretchable bonding coat 52 (40) on one surface of said backing, a layer of a plurality of stabilized nylon strands 12, laterally spaced in said bonding coat and longitudinally disposed on the backing of the tape, and a layer of soft, rubbery, cohesive, normally tacky and pressure sensitive adhesive 54 overlying said layer of bonded strands.

Pressure sensitive adhesive tapes were prepared using the methods described above in the following examples:

EXAMPLE I

Two hundred sixty (260) ends of oriented 840 denier one-half twist type 700 nylon yarn strands having a residual shrinkage of 9% were stabilized by passing through a water bath for a six second period maintained at 190–212° F. and dried. The stabilized strands had a residual shrinkage of about 2%. The strands maintained in spaced relationship (32 ends per inch width) by the use of suitable reeds were bonded to a 0.0015 inch cellulose acetate film backing. The laminating or bonding coat was a solvent (toluene) solution of a pressure sensitive adhesive applied to the backing at a rate of about 1.25 oz./yd.² (dry weight). The adhesive formulation is as follows:

*Adhesive*

| | Parts |
|---|---|
| Pale crepe | 100 |
| Aluminum hydrate | 60 |
| Polyterpene resin (M.P. 70° C.) | 30 |
| Polyterpene resin (M.P. 115° C.) | 30 |
| Lanolin | 10 |
| Antioxidant | 1 |

The strands were applied to the wet bonding coat after which the solvent was removed. A subsequent application of the same adhesive to the laminated strands at 2.75 oz./yd.² (dry weight) provided an overlying layer of normally tacky and pressure sensitive adhesive on the finished sheet. The sheet was then slit into narrow widths (e.g. 1 inch) using a Cameron slitter and formed into rolls. The finished tape product had the following physical properties:

*Physical Properties*

Tensile strength _____ 520–540 pounds/inch width.
Impact strength _____ 480 inch pounds/inch width.
Thickness _____ 0.011 inch.

EXAMPLE II

A tape similar to that described in Example I was prepared using the nylon strands stabilized by the foregoing method laminated to a Mylar (polyethylene terephthalate) film backing 0.0015 inch thick. The lamination step was carried out by first coating the film with a layer of heat sensitive bonding coat from solvent (toluene) solution followed by drying. The coating was applied at the rate of about 1.25 oz./yd.$^2$ (dry weight) and had the following formulation:

| | Parts |
|---|---|
| Butadiene-styrene rubber (55/45) | 100.0 |
| Coumarone indene resin, M.P. 135° C. (Cumar W) | 75 |
| 2.5'-ditertiary-amyl hydroquinone (Santovar A) | 1.5 |
| Ditertiary-butyl-para-cresol (Ionol) | 1.5 |
| Toluene (solvent) | 362.0 |

After drying the coated sheet was passed over a heated drum to activate the laminating adhesive while the shrunk nylon strands were pressed into the warm tacky adhesive coating at the same time followed by passing the sheeting and strands between a pair of opposed pressure rollers to complete the lamination. The shrunk nylon strands were spaced using suitable reeds to give 32 ends per inch. The strand surface of the laminate was then solvent coated with a layer of the adhesive (2.75 oz./yd.$^2$ dry weight) to provide a layer of normally tacky and pressure sensitive adhesive. The sheet was slit to width and formed into rolls. The product had substantially the same physical properties as the tape of Example I.

In preparing the stabilized-nylon strand reinforced pressure sensitive adhesive tapes of this invention, bonding coats, adhesives and backing materials of the type described in Bemmels United States Patent No. 2,750,314 are quite suitable for use herein and all of the teachings of that patent are useful and applicable in so far as they apply to stabilized nylon strand reinforced pressure sensitive tapes.

For example as disclosed in the Bemmels patent, suitable backing materials include thin fibrous webs such as paper, relatively flexible and conformable plastic sheets and films such as polyethylene, cellulose esters, and ethers, vinyl chloride polymers and copolymers, polyamides, polyesters and the like as well as woven fabrics such as cloth and the like. Similarly the adhesives and bonding coats may be based on cohesive, yieldable, polymeric materials which are relatively soft and stretchable such as for example natural rubber, vinyl ether polymers, polyester resins, synthetic rubbers such as GR-S, Buna N, butyl, neoprene and the like. Of course when elastomeric or polymeric materials of the character disclosed are utilized as a base for pressure sensitive adhesives suitable modifications in plasticizers and addition of tackifying resins should be made in the manner well known to the art.

Of course, conventional practices in preparing pressure sensitive adhesive tapes are applicable herein and the present invention contemplates the use of primers and release coats as are well known to the art.

While the above illustration specifically utilizes a hot water bath at about 190-212° F., it is also true that the shrinkage or stabilization of the nylon strands prior to incorporation into tapes may be carried out in a continuous manner by passing the strands through a heated oven (such as a hot forced air circulating oven) maintained at temperatures of from 190° to 400° F. The time required for stabilization may vary with the temperature utilized, although times of from 10 to 60 seconds are satisfactory. Stabilization or shrinkage of the nylon strands may also be accomplished by passing the nylon strands through a steam chamber for a period of from about 5 to 10 seconds and subsequently drying said yarns as by passing them through a drying oven.

The foregoing has described the operation of shrinking a plurality of strands and continuously forming and incorporating the strands into a pressure sensitive tape. Of course the strands may be treated and stabilized in a separate operation as a group or individually and wound into beams for use at some later time in the manufacture of reinforced tapes.

A single beam has been illustrated in the drawing, but in commercial operations several beams, each containing a plurality of strands wound thereon may be combined by passing the strands through reeds to secure the requisite spacing and number of strands across the tape backing.

In general the tapes of this invention should have the nylon or other polymeric strands thereof maintained in spaced lateral relationship to each other and of course longitudinally disposed the length of the tape roll. The individual strands are preferably maintained disconnected from each other. The strands are surrounded by, and the spaces between them are filled with, the bonding coat and/or pressure sensitive adhesive to the substantial exclusion of air. Accordingly the strands are independently movable with respect to each other and are maintained in their positions solely by the cohesive forces provided by the yieldable cohesive matrix surrounding the same, which matrix may be considered as comprising bonding medium, pressure sensitive adhesive, or both. Of course, the pressure sensitive adhesive may also be utilized for the bonding coat as described herein.

While the specific illustrations depict a strand reinforced pressure sensitive adhesive tape wherein the strands are partially imbedded in bonding coat, it is also possible to completely imbed said strands therein.

If desired, a layer of strands may be encased in a stretchable, yieldable, cohesive material such as polyethylene and enveloped or bonded therein, thereby eliminating a backing material distinct from the bonding coat and the pressure sensitive adhesive then applied to such encased strand material.

In any event, whatever particularly form is chosen, a matrix of a soft, cohesive resilient material is provided to bond the plurality of laterally spaced strands together in layer form to which layer of bonded strands is affixed a layer of normally tacky and pressure sensitive adhesive.

While the foregoing examples have been illustrative of the preparation of stabilized, oriented nylon strand reinforced pressure sensitive adhesive tapes, it should be understood that the strand reinforced backing materials prepared therein may be produced and utilized as such without a coat of overlying pressure sensitive adhesive. While the strand reinforced sheeting has particular value as a backing material for pressure sensitive adhesive tapes, it is also contemplated that it be used for wrappers, tying materials, sheathing and the like in applications which require unusual strength properties in one direction.

Of course, while nylon strands are particularly adapted for the stabilization procedure herein set forth, it is intended to include within the teachings herein set forth the application of the method to other linear oriented polymeric strand reinforced products which may be similarly benefited by the stabilization techniques prior to incorporation into finished products, and particularly pressure sensitive adhesive tapes. For example, the present invention is applicable to strand reinforced pressure sensitive adhesive tapes utilizing strands of oriented Dacron (polyethylene terephthalate) and Orlon (acrylic fiber) both products of E. I. du Pont de Nemours Company.

While several particular embodiments of this invention are shown above, it will be understood of course, that the invention is not to be limited thereto, since many modifications may be made, and it is contemplated, therefore, by the appended claims, to cover any such modifications as fall within the true spirit and scope of this invention.

What is claimed is:

1. A process for preparing stabilized-nylon strand reinforced pressure sensitive adhesive tape which comprises thermally stabilizing at a temperature above about 190° F. substantially untensioned oriented nylon strands to a residual shrinkage of less than 3.5% forming said strands into a layer of laterally spaced longitudinally extending strands, applying said strands to a bonding coat of a cohesive, soft, rubbery material affixed to a backing, applying a layer of a normally tacky and pressure sensitive adhesive to said bonded strands longitudinally slitting said backing having affixed bonding coat, strands, and overlying pressure sensitive adhesive and forming said slit portions into rolls.

2. A process for preparing a stabilized-nylon strand reinforced pressure sensitive adhesive tape which comprises thermally stabilizing substantially untensioned oriented nylon strands in a bath of water maintained at a temperature above 190° F. and up to about 212° F. until residual shrinkage is less than 3.5 percent, drying said strands, forming said stabilized strands into a layer of laterally spaced and longitudinally extending strands, bonding said layer of strands to a backing material with a soft, rubbery and cohesive bonding coat, applying to said strands a layer of normally tacky and pressure sensitive adhesive, longitudinally slitting the pressure sensitive adhesive tape thus produced and forming said slit portions into rolls.

3. The process of claim 2 wherein the backing is a polymeric film backing.

4. The process of claim 3 wherein the film backing is cellulose acetate.

5. A method of preparing a stabilized-nylon strand reinforced pressure sensitive adhesive tape, comprising passing substantially untension oriented nylon strands through a thermal stabilizing zone maintained at a temperature above 190° F., whereby residual shrinkage in said strands is reduced to less than 3.5 percent, forming said strands into a layer of laterally spaced, longitudinally extending strands, bonding said layer of stabilized strands to a backing material with a cohesive, soft, rubbery bonding coat, applying to said bonded strands a layer of normally tacky and soft pressure sensitive adhesive, longitudinally slitting the pressure sensitive adhesive tape thus produced, and forming said slit portions into rolls.

References Cited in the file of this patent

UNITED STATES PATENTS

| | | |
|---|---|---|
| 2,157,117 | Miles | May 9, 1939 |
| 2,199,411 | Lewis | May 7, 1940 |
| 2,307,846 | Miles | Jan. 12, 1943 |
| 2,365,931 | Benger | Dec. 26, 1944 |
| 2,418,904 | Rugeley et al. | Apr. 15, 1947 |
| 2,739,919 | Artzt | Mar. 27, 1956 |
| 2,750,314 | Bemmels | June 12, 1956 |
| 2,807,863 | Schenker | Oct. 1, 1957 |